No. 765,022.

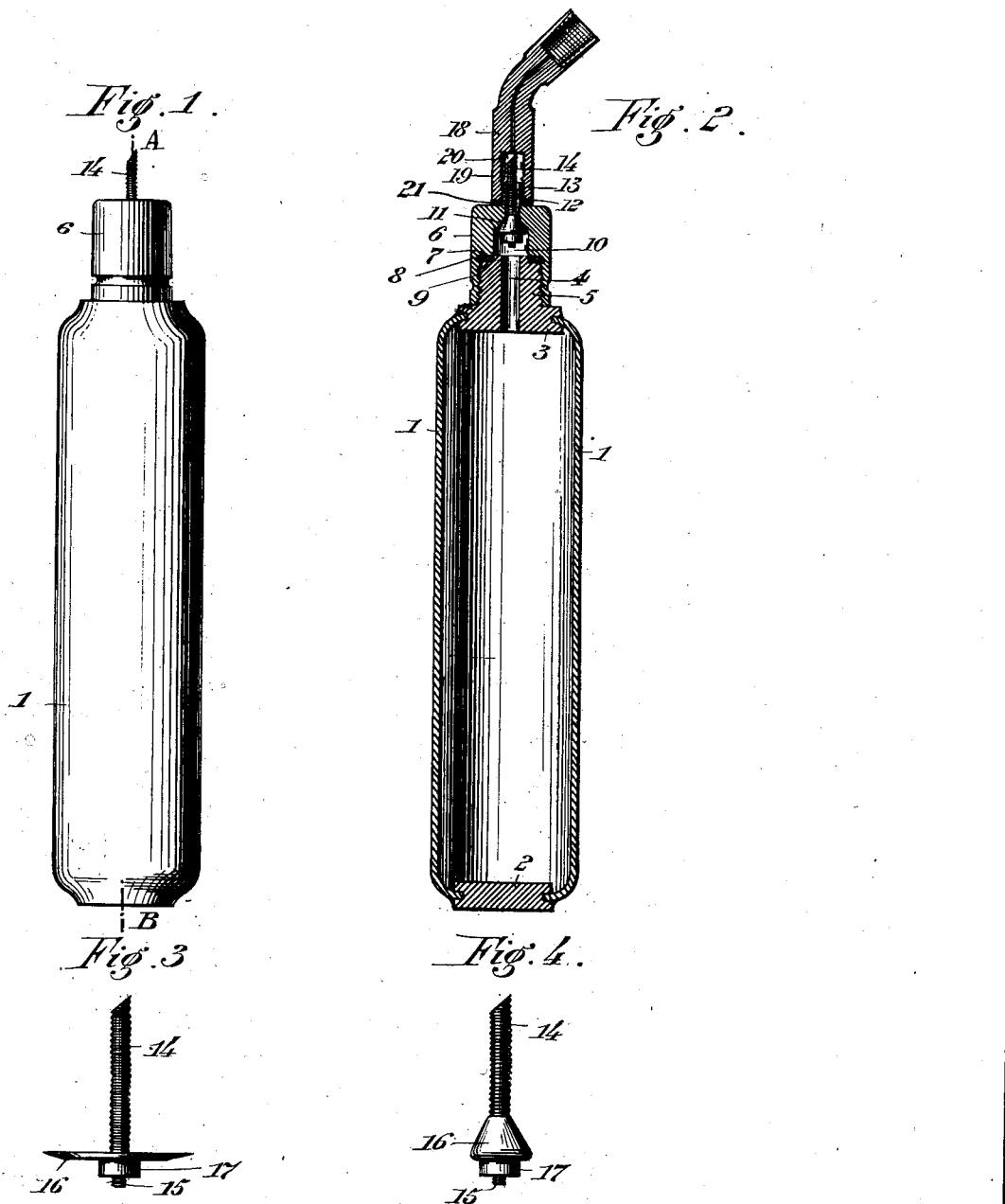

Patented July 12, 1904.

UNITED STATES PATENT OFFICE.

MAX LOEWENSTEIN AND JONAS STORK, OF BRUSSELS, BELGIUM; SAID LOEWENSTEIN ASSIGNOR TO SAID STORK.

RECEPTACLE FOR STORING COMPRESSED AIR OR GASES.

SPECIFICATION forming part of Letters Patent No. 765,022, dated July 12, 1904.

Application filed July 1, 1903. Serial No. 163,923. (No model.)

*To all whom it may concern:*

Be it known that we, MAX LOEWENSTEIN and JONAS STORK, both subjects of the King of the Belgians, and residents of Brussels, Belgium, have invented an Improved Receptacle for Storing Compressed Air or Gases, of which the following is a specification.

The object of the present invention consists of a receptacle wherein air compressed to a high pressure may be stored. This light and portable receptacle permits cyclists and persons using motor-cars furnished with one to instantaneously inflate the pneumatic tires of their machines without the help of pumps. It can also serve to contain gases under pressure intended for therapeutic or hygienic purposes, such as disinfecting-gases, &c., as well as to many other uses which cannot be mentioned here.

In the annexed drawings, Figure 1 is an elevation view of the device. Fig. 2 is a longitudinal section of the receptacle on A B of Fig. 1, as well as of a union for the automatic discharge of the contents of the said receptacle to inflate the pneumatic tire of a vehicle. Fig. 3 shows the valve at one stage of its construction, and Fig. 4 shows the valve completed.

A cylinder is formed of a drawn-steel cylindrical tube 1, similar to the Mannesmann tubes. One of its ends is closed by a steel disk 2, provided upon its cylindrical edge with a groove into which is placed the edge of one end of the tube 1, previously bent, as shown in Fig. 1. A special brazing completes the tight and resisting fitting together of the two parts. The other ends of the receptacle, which also constitutes its discharge-nozzle, is likewise formed by a steel plug 3, provided upon its circumferential edge with a groove wherein fits the edge of the other end of the tube 1. This edge is previously bent for this purpose. A brazing completes the fitting together and assures the necessary tightness and resistance. This plug is provided at its center with a circular opening 4, thereby permitting in the hereinafter-described manner the escape of air or gases contained in the receptacle. The aforesaid plug is integral with a nozzle 5, screw-threaded upon its outer and cylindrical surface. This nozzle is intended to receive a steel closing-cap provided interiorly with a shoulder 7, which comes in contact when it is screwed upon the nozzle with a lead washer 8, fitted upon a shoulder 9 at the end of the nozzle 5 to thus assure a tight joint. The said closing-cap 6 is hollowed out following its axis, so as to form a chamber 10, terminating at its top end in a truncated cone 11, continued by a cylindrical hole 12, leading into a tubular part 13 at the end of the cap 6.

The valve the construction and position whereof inside the cap constituting one of the characteristics of the invention comprises a screw-threaded spindle 14, terminating at its lower end by an extension 15 of a smaller diameter also screw-threaded and forming, with the spindle, a shoulder against which a leather washer 16 bears, the circumferential edge whereof is beveled or chamfered all the way around. This edge is bent against the spindle 14 and surrounds the shoulder (see Fig. 4) in such a manner that it partakes of a truncated form, and a small nut 17, screwed upon the part 15 of the spindle 14, maintains the said washer against the aforesaid shoulder. The valve being placed as shown by Fig. 1, its spindle 14 is able to move freely in the cylindrical hole 13 of the cap. The existing pressure in the receptacle pushes the valve against the truncated side 11 of the chamber 10, thereby assuring an absolute tightness resulting from the construction of the valve.

The receptacle being charged with compressed air or gas under pressure, this pressure is indefinitely maintained until it is required to draw off the charge, which is performed automatically and without the assistance of any tap whatsoever. The filling, for instance, of an air-chamber by the compressed air contained in the receptacle is performed in the following manner: The nozzle is screwed upon the valve of the pneumatic tire and then the screw-threaded end of the nozzle 13 is screwed into the tapped socket 19 of the union 18. A moment arrives when the inner shoulder 20 of the socket 19 will come in contact with the end of the valve-spindle 14. If the turning of the receptacle be continued in order to screw the nozzle 13 farther into the socket 19, the pressure of the shoulder causes the valve to be detached from the conical wall 11 and the compressed air to escape from the receptacle through the annular space between the spindle 14 and the side of the hole 12 and penetrate into the socket 19, from whence it escapes through the very small hole arranged along the axis of the union. The end of the spindle 14 is chamfered, so as to facilitate the passage of this air. A leather washer 21, upon which bears the union, assures a tight joint.

Owing to the small section of the valve which is submitted to the inner pressure of the air inside the receptacle the shifting of the valve-spindle for opening the same only requires a small effort. Besides shifting being caused by the advance of the two screw-threaded surfaces one into the other a regulation of the escape of the compressed air can be secured, that may be called "micrometrical," as required. The valve being arranged inside the closing-cap can be withdrawn as required for cleaning or repairs without being obliged to touch the receptacle proper.

The faculty of an exact regulation of the escape of the gases contained in the above-described receptacle offers numerous advantages for the application of this device to therapeutic and hygienic purposes, as well as to all other applications of which it is susceptible.

Having now fully described our invention, what we claim, and desire to secure by Letters Patent, is—

In a receptacle for compressed gases, the combination with the receptacle, of a plug forming one end thereof, and having an outlet therethrough and externally threaded, a cap adapted to engage with said threaded plug and having an externally-threaded projection thereon and a conical recess therein, a valve engaging with said recess and having a stem projecting through a hole in said threaded projection, and a connecting-nozzle having a threaded end adapted to engage with said threaded extension on said cap, and having an internal shoulder adapted to engage with the valve-stem for opening said valve.

MAX LOEWENSTEIN.
JONAS STORK.

Witnesses:
C. SCHERZ,
H. EMAULT.